May 8, 1928.
W. E. TROMBLAY
1,668,990
EXPANSIBLE MANDREL
Filed Feb. 12, 1925
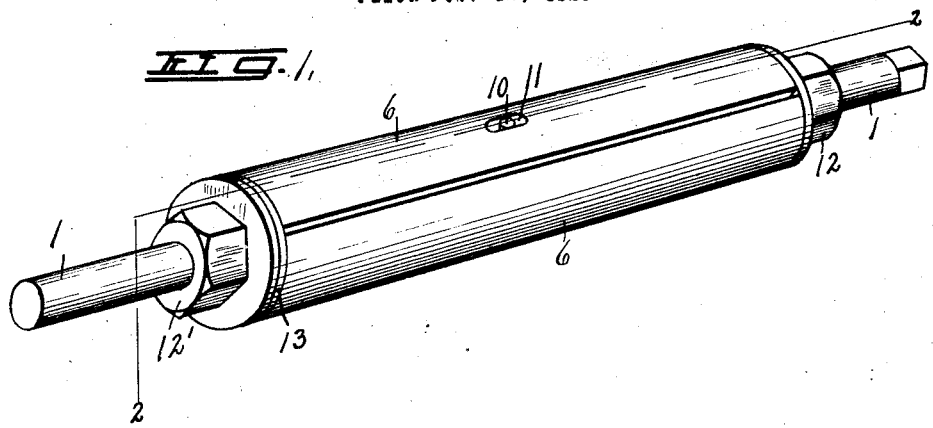
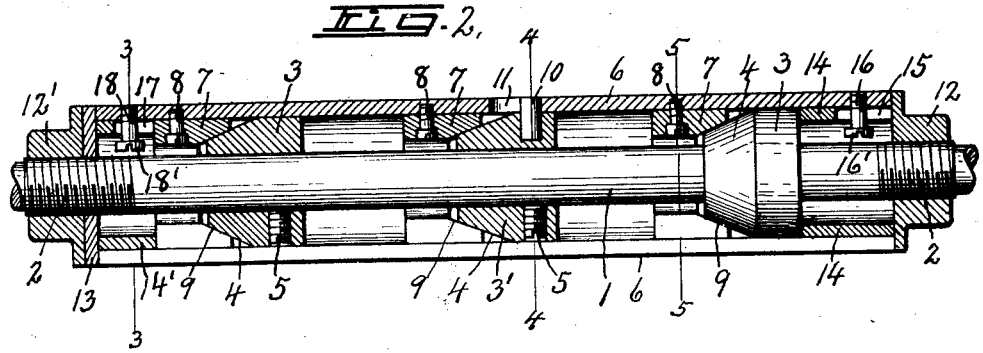
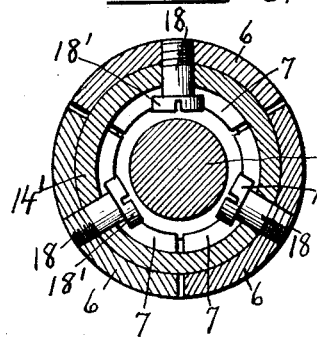 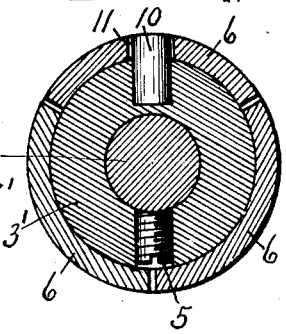 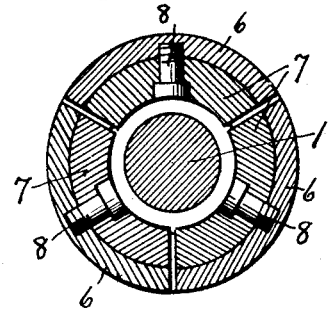
WITNESS
INVENTOR
BY
ATTORNEYS Patented May 8, 1928.

1,668,990

UNITED STATES PATENT OFFICE.

WILLIAM E. TROMBLAY, OF FULTON, NEW YORK.

EXPANSIBLE MANDREL.

Application filed February 12, 1925. Serial No. 8,749.

This invention relates to an expansible mandrel or core for heavy paper rolls and analogous uses, the main object being to provide an expansible mandrel of this type which is comparatively light, strong and durable and may be easily and quickly expanded or contracted by a suitable operating means at one end thereof.

Another object is to provide means whereby the expansive segments may be easily and quickly assembled and held in operative position against accidental displacement and at the same time firmly locked to the supporting shaft.

Other objects and uses relating to specific parts of the device will be brought out in the following description.

In the drawings:

Figure 1 is a perspective view of an expansive mandrel embodying the various features of my invention.

Figure 2 is a longitudinal transverse sectional view of the same taken on line 2—2, Figure 1.

Figures 3, 4 and 5 are enlarged, transverse, sectional views taken respectively in the planes of lines 3—3, 4—4 and 5—5, Figure 2.

As illustrated this device comprises a central shaft —1— having opposite threaded ends —2— and —2'— and a series of, in this instance, three intermediate collars —3— and —3'— having conical ends —4— facing in the same direction or toward one end of the shaft, said collars being arranged in axially spaced relation and adjustable axially on the shaft and are held in their adjusted positions by set screws —5—, Figures 2 and 4.

A plurality of, in this instance, three cylindrical segments —6— are arranged circumferentially around the shaft —1— and collars —3— and extend lengthwise of the shaft some distance beyond the inner ends of the threaded portions —2— and, therefore, beyond the outer ends of the end collars —3—. Each of these cylindrical segments —6— is provided with a plurality of, in this instance, three collar segments —7— arranged in axially spaced relation corresponding to the spacing of the collars —3— and —3'— and secured thereto by screws —8—, Figures 2 and 5, said collar segments being provided with conical faces —9— arranged to engage the conical faces —4— of the corresponding collars —3— and —3'—.

The middle collar —3'— on the shaft —1— is provided with a radially projecting pin —10— adapted to enter an axially elongated slot —11— in one of the segments —6— for locking said segment and collar and incidentally the shaft —1— against relative rotary movement while permitting a limited relative axial movement for a purpose presently described.

The cylindrical segments —6— with their collar segments —7— and the shaft —1— with its collars —3— and —3'— are adjustable axially relatively to each other by means of nuts or adjustable end heads —12— and —12'— which engage the threaded portions —2— of the shaft —1— at opposite ends of the segments —6—, one of said nuts as —12— being engaged directly with the adjacent end of the segments while the nut —12'— engages a washer —13— which, in turn, engages the adjacent ends of the cylindrical segment —6— so that when both nuts are tightened the segments —6— and shaft —1— will be held against relative endwise movement.

On the other hand by loosening one of the nuts and tightening the other, the segments —6— and shaft —1— may be removed axially relatively to each other.

For example, if it is desired to expand the mandrel by moving the segment —6— outwardly it is simply necessary to loosen the nut —12— and to tighten the nut —12'— which will cause the conical ends of the collars —3— to ride against the conical faces —9— of the collars —7— thereby forcing the segments —6— outwardly and radially.

By reversing the direction of rotation of the nuts —12— the shaft —1— with its collars —3— will be drawn endwise a sufficient distance to disengage the conical portions —4— from the conical faces —9— thereby allowing the segments —6— to move inwardly toward the axis of the shaft.

The axial adjustability of the collars —3— and —3'— on the shaft —1— permits the collars to be set to engage their respective segments —7— simultaneously and thereby to exert equal pressure or release at different portions of the segments —6— throughout their lengths.

Suitable means is provided for holding the cylindrical segments —6— in equally spaced relation circumferentially and for this purpose a pair of sleeves —14— and —14'— are placed within opposite ends of the segments around the adjacent portions of the shaft —1— at the outer ends of the end collars —3—, the sleeve —14— being provided with a series of, in this instance, three radial slots —15— in equally spaced relation circumferentially and axially elongated from their outer ends for receiving suitable studs —16— on the adjacent ends of the segments —6—.

These studs —16— extend inwardly some distance beyond the inner face of the sleeve —14— to allow a limited radial movement of the segment —6— and are provided at their inner ends with heads —16'— for limiting the outward movement of the segments and thereby holding them in operative position ready for use.

The collar —14'— is also provided with a plurality of, in this instance, three radial slots —17— arranged in uniformly spaced relation circumferentially and elongated axially from their inner ends for receiving a corresponding number of studs —18— on the adjacent ends of the segments —6— for additionally holding said segments in uniformly spaced relation circumferentially.

These studs —18— also extend inwardly beyond the inner face of the sleeve —14'— to permit limited radial movement of the segments and are provided on their inner ends with heads —18'— for limiting the outward movement of the segments and thereby assisting and holding said segments against displacement from the sleeves except as hereinafter provided.

In order to remove the segments —6— from the shaft it is necessary to first unscrew the nut —12'— a sufficient distance to permit the washer —13— and sleeve —14'— to be withdrawn endwise from within the adjacent ends of said segments and then to unscrew the nut —12— a sufficient distance to permit the studs —16— to be displaced endwise from the slots —15— by a corresponding endwise movement of the segments —6— which is permitted by rocking the previously loosened ends of the segments outwardly or radially far enough to permit the collar segments 7— to clear their companion collars —3— and —3'— whereupon the endwise movement of the segments in the direction of the previously removed nut —12— and disengage the lugs —16— from the slots —15— and thus permit the removal of the segments following which the sleeve —14— may be removed endwise or axially.

When assembling the segments —6— the sleeve —14— is first placed upon the adjacent end of the shaft —1—and against the outer end face of the adjacent collar —3— whereupon the segments may be successively placed in operating position by interlocking their respective lugs —16— in the corresponding slots —15— after which the opposite ends of the segments —6— are moved inwardly toward the axis of the shaft and the sleeve —14'— is then placed in operative position with its slots registering with the studs —18—.

The nuts —12— and —12'— may then be placed in operative position upon the threaded portions —2— and tightened to lock the shaft and segments together against relative rotary movement, it being understood that the segment having the slot —11— will be placed in position to engage the lug —10— for holding the shaft and segments —6— against relative rotary movement while the studs —16— and —18— cooperating with their respective slots —15— and —17— of the sleeves —14— and —14'— serve to hold the segments in uniformly spaced relation circumferentially.

The expansion of the mandrel may be accomplished by simply loosening the nut —12— and tightening the nut —12'— while the diverse operation of the nuts allows the mandrel sections to contract.

It is, of course, understood that one or more washers —13— may be used at either end of the mandrel or may be entirely omitted depending upon the amount of adjustment which may be necessary to effect the desired expansion and contraction of the segments —6—.

What I claim is:

1. An expansible mandrel having radially movable segments arranged about a common axis, a sleeve disposed within said segments around said common axis and having lengthwise slots open at one end and studs on the segments projecting into the slots for holding the segments in circumferentially spaced relation, said studs having means engaging said sleeves to limit the radial movement of said segment, and means on said shaft for moving said segments radially and outwardly.

2. An expansible mandrel having radially movable segments arranged about a common axis, a sleeve disposed on the inner sides of said segments about said common axis having lengthwise slots extending inwardly from one end thereof, and lugs on the segments projecting into said slots for holding the segments in spaced relation, said lugs having heads co-operating with the sleeve to limit the outward radial movement of the segments, means for relatively adjusting the segments and shaft axially, and adjustable means including collars having circular frusto-conical surfaces for moving the segments radially and outwardly.

3. An expansible mandrel comprising a shaft radially movable cylindrical segments arranged about a shaft, said shaft and segments being relatively movable endwise, a sleeve disposed on the inner sides of said segments and having lengthwise slots registering with the segments and open at one end, and lugs on the segments slidable radially and lengthwise in the slots, said segments and shaft having means for moving the segments radially by said relative endwise movement, said lugs engaging said sleeve to limit the radial movement of said segments and hold them in spaced relation.

4. An expansible mandrel having radially movable segments arranged about a shaft, sleeves at opposite ends of the segments and each provided with lengthwise slots registering with the segments and open at one end, lugs on the segments projecting through the slots for holding the segments in spaced relation circumferentially, and cooperating means on said shaft and segments for moving the latter radially and outwardly.

In witness whereof I have hereunto set my hand this 24 day of January, 1925.

WILLIAM E. TROMBLAY.